July 9, 1968 W. W. THULIN 3,392,033
FILM PACKAGE FOR DIRECT HEATING OF FOOD
Filed Nov. 26, 1965
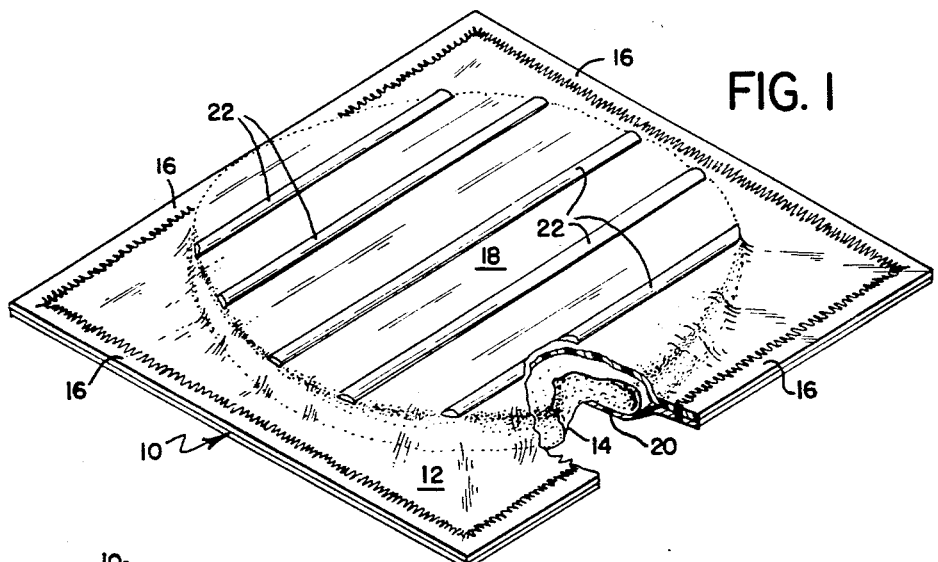
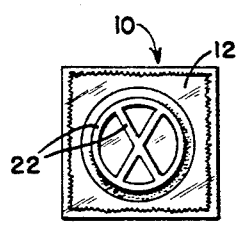
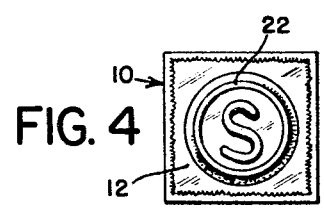
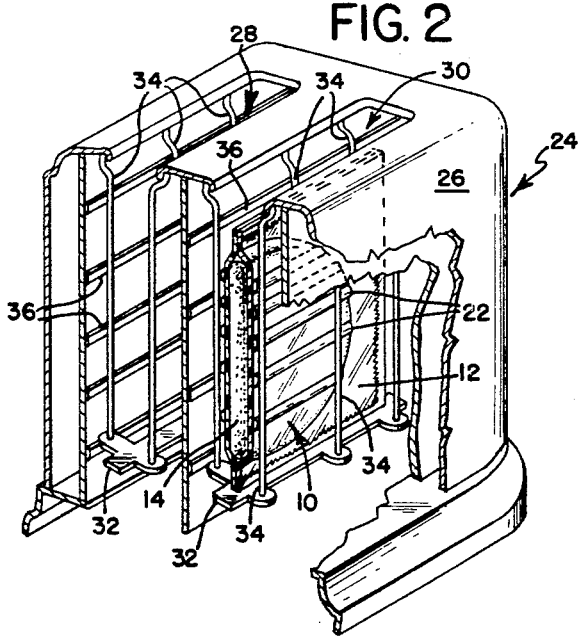
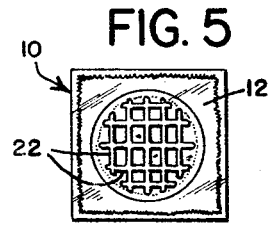
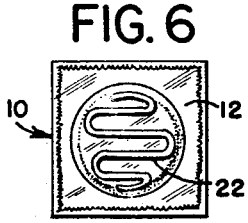
INVENTOR.
WALTER W. THULIN
BY *Kenneth D. Ohm*
ATTORNEY

United States Patent Office 3,392,033
Patented July 9, 1968

3,392,033
FILM PACKAGE FOR DIRECT HEATING
OF FOOD
Walter W. Thulin, Minneapolis, Minn., assignor to
General Mills, Inc., a corporation of Delaware
Filed Nov. 26, 1965, Ser. No. 509,763
4 Claims. (Cl. 99—171)

The present invention relates to improvements in food product packages. More particularly, it pertains to food product packages wherein the product can be safely heated in an electrical heating unit without removal of the product from the package.

Some food product packages consisting of sheets or layers of metal foil are currently in use by the packaging industry. These metal foil packages have the disadvantage of being electrically conductive. Thus, when such packages are in, inserted in and/or withdrawn from an electrical heating unit such as an electric toaster, there is the possibility that electric current from the heating elements of such toaster might be inadvertently conducted to the person handling such packages.

Accordingly, one object of the present invention is to provide a food product package for containing a food product in which such product can be safely heated while in such package in an electrical heating unit without any danger of receiving an electrical shock through said package.

Other objects and advantages of the invention will be apparent from the following description in which certain preferred embodiments of the invention are disclosed.

FIGURE 1 is a perspective view of a food product package constructed in accordance with the present invention;

FIG. 2 is a sectional view of an electric toaster in which the package of FIGURE 1 (also shown in section) may be placed for heating the food product contained therein;

FIGS. 3, 4, 5 and 6 are reduced top views of the package of FIGURE 1 showing various modifications in the arrangement of the bumper of the present invention.

Referring now to the figures, FIGURE 1 shows a food product package 10 manufactured in accordance with the present invention. The package comprises an envelope or pouch 12 formed of material which is preferably a flexible, translucent material such as Mylar, surrounding and containing an edible food product 14. The material of the envelope 12 is sealed onto itself to completely enclose the product 14. This is accomplished by any of the methods known in the art, such as applying heat and pressure to the exterior overlying portions 16 of the envelope 12 or by applying adhesives to such overlying portions. The major portions of the upper surface 18 and the lower surface 20 of the envelope 12 are provided with a bumper 22.

The bumper 22 is formed of material having a melting point above the temperature normally developed in an electric toaster, i.e., 500° Fahrenheit and above. Examples of such high melt resistant materials are heat resistant phenolics, melamine resins, glass filled alkyd resins, polytetrafluoroethylene, and flame resistant string. The arrangement of the bumper 22 is infinitely variable. Some of these variations are shown in FIGS. 3, 4, 5 and 6. The primary purpose of bumper 22 is to insure that when the package 10 is placed in the heating chamber of an electrical heating unit, such as an electric toaster 24 as shown in FIG. 2, that the material of the envelope 12 will not come into direct physical contact with any hot element of the heating unit, such as the electrical heating elements or the guide wire elements of such a heating unit.

The toaster 24 comprises a body 26 having chambers or wells 28 and 30 adapted to receive packages which are sized compatible for insertion therein, such as package 10. In a toaster like 24 the packages like 10 are supported by carriages 32 which move vertically within the wells upon guide wire elements 34. The electric heating elements of the toaster 24 are denoted by numeral 36. The guide wire elements 34 help to keep any items inserted in wells 28 and 30 from direct contact with the heating elements 36. The foregoing general construction of an electric toaster is conventional and forms no part of the invention. It is, therefore, unnecessary to discuss the toaster structure in any further detail.

The characteristics of the material of the envelope or pouch 12 for containing the edible food product are important. More specifically, since the envelope 12 with the edible food product contained therein is to be inserted into the heating chamber of an electrical heating unit, it is preferable that the envelope material be relatively electrically nonconductive, i.e., an electric insulating type of material. For visual appeal as well as for readily identifying the contents thereof, it is also desirable that the envelope be translucent so the food therein will be readily visible. If there is no need or desire to see the contents of the envelope through said envelope, it can be opaque.

Envelope material which will generally satisfy the foregoing specifications may be formed of the well-known polyester films. Two films which have proved satisfactory for the envelope are cellophane and "Mylar." "Mylar" is a polyester film made from polyethylene terephthalate with the polymer being formed by the condensation reaction between ethylene glycol and terephthalic acid. Since the heating chambers 28 and 30 of the electrical heating unit 26 may well reach temperatures above 500° Fahrenheit, it is preferable that the bumper 22 be of material, such as previously disclosed, having a melting point far above 500° Fahrenheit so that the bumper can perform its primary function of keeping the major portions 18 and 20 of envelope 12 from coming into direct contact with any wires within the heating chamber which might attain temperatures of 500° Fahrenheit or higher.

In view of the principles set forth herein, I have shown some of the ways of carrying out the present invention and some of the equivalents which are suggested by these disclosures.

Now therefore I claim:

1. A food product package for use with an electrical heating unit comprising an edible product, an envelope of electric insulating packaging material surrounding and containing said product, said envelope having dimensions suitable for insertion into a toaster, and bumper means on said envelope to protect said envelope from direct physical contact with the heated portions of said heating unit, said bumper having a melting point above the maximum temperature to which the envelope will be subjected while in the heating chamber of said heating unit.

2. A food product package as set forth in claim 1 in which the envelope is flexible and translucent.

3. A food product package as set forth in claim 1 in which the bumper is made of material selected from the group consisting of heat resistant phenolics, melamine resins, glass filled alkyd resins, polytetrafluoroethylene and flame resistant string.

4. A food product package as set forth in claim 1 in which the bumper is made of material having a melting point above 500° Fahrenheit and having low heat and electrical conductivity.

References Cited

UNITED STATES PATENTS

| | | | |
|---|---|---|---|
| 2,051,960 | 8/1936 | McCaskell | 229—3.5 |
| 3,100,711 | 8/1963 | Eisler | 99—171 |
| 3,185,372 | 5/1965 | Ferraro | 229—3.5 |
| 3,322,319 | 5/1967 | Sweeney et al. | 229—3.5 |

A. LOUIS MONACELL, *Primary Examiner.*

E. A. MILLER, *Assistant Examiner.*